United States Patent [19]

Gillett et al.

[11] E Patent Number: Re. 33,604

[45] Reissued Date of Patent: Jun. 4, 1991

[54] CONNECTOR MECHANISMS

[75] Inventors: John B. Gillett, Woodstock; John A. Miraglia, West Hurley, both of N.Y.

[73] Assignee: International Business Machines Corporation, Armonk, N.Y.

[21] Appl. No.: 126,808

[22] Filed: Nov. 30, 1987

Related U.S. Patent Documents

Reissue of:

[64] Patent No.: 4,636,019
Issued: Jan. 13, 1987
Appl. No.: 801,386
Filed: Nov. 22, 1985

U.S. Applications:

[63] Continuation of Ser. No. 577,460, Feb. 6, 1984, abandoned.

[51] Int. Cl.[5] ..... H01R 9/09; H01R 13/629

[52] U.S. Cl. ..... 439/62; 439/260; 439/329; 439/493

[58] Field of Search ..... 439/59-62, 439/260, 267, 325-328, 629-637

[56] References Cited

U.S. PATENT DOCUMENTS

| | | | |
|---|---|---|---|
| 2,952,002 | 9/1960 | Angele et al. | 339/75 MP |
| 3,825,878 | 7/1974 | Finger et al. | 339/176 MF |
| 3,922,054 | 11/1975 | Dechelette | 339/75 MP |
| 4,211,459 | 7/1980 | Madden | 339/75 MP |
| 4,293,179 | 10/1981 | Vonder | 339/17 LC |
| 4,428,635 | 1/1984 | Hamsher, Jr. et al. | 339/176 MP |
| 4,466,184 | 8/1984 | Cuneo et al. | 339/17 F |
| 4,544,223 | 10/1985 | Gillett | 339/75 MP |
| 4,553,192 | 11/1985 | Babuka et al. | 339/75 MP |

FOREIGN PATENT DOCUMENTS

| | | | |
|---|---|---|---|
| 1808453 | 1/1971 | Fed. Rep. of Germany | 339/17 F |

OTHER PUBLICATIONS

"Electrical Connector for Flat Flexible Cable", IBM Bulletin, vol. 25, No. 1, Jun. 1982, by Knight and Smith.

*Primary Examiner*—Gary F. Paumen
*Attorney, Agent, or Firm*—Robert L. Troike

[57] ABSTRACT

A connector mechanism for electrically connecting two structures 22, 24 carrying conducting lines 26, comprises fixed contacts 28 on one of the structures and floating contacts 30 on the other of the structures, the floating contacts being free to move towards and away from the fixed contacts and across the fixed contacts as independent motions, under the control of a common actuator 50, 52, 54, each floating contact being an electrically integral part, carried by the actuator, of a flexible conductive film 34.

The provision of a shroud 46 on the fixed contact structure carrying markings 48A, 48B registered with the fixed contacts 28 and engaging the actuator provides coarse location, while the flexibility of the web and the mounting of the floating contacts on a resilient pad 38 on a carriage 50 provided with cam followers 54 riding on a multi-throw linear cam 52, together comprising the actuator permits independent locating and wiping motions, independently of each other and at selected pressures, including zero pressure on insertion, making the connector mechanism an effective ZIF connector.

41 Claims, 5 Drawing Sheets

CONNECTOR MECHANISMS

Matter enclosed in heavy brackets [ ] appears in the original patent but forms no part of this reissue specification; matter printed in italics indicates the additions made by reissue.

This application is a *re-issue of U.S. Pat. No. 4,636,019 issued Jan. 13, 1987 from application Ser. No. 801,386 filed Nov. 22, 1985 which is a* continuation of application Ser. No. 577,460 filed Feb. 6, 1984, now abandoned.

FIELD OF THE INVENTION

The present invention relates to connector mechanisms for releasably electrically connecting two structures which carry conducting lines and provides a solution to the problem, common to such connector mechanisms, of accommodating both the damage free engagement/dis-engagement of the two separable portions of the connector mechanism as well as establishing the positive and accurate the internal electrical coupling required. The term "Zero Insertion Force (ZIF)" Connectors is frequently applied to such mechanisms.

BACKGROUND OF THE INVENTION

It is normal for data processing equipment to be aggregated of a plurality of cards, which have electrical components mounted thereon and which have the intercomponent and intercard electrical connections provided by conducting lines formed on the card surfaces. Such cards are assembled into a housing and/or onto a board, also incorporating conducting lines, the function of which is to transmit electrical signals from component to component, card to card and from card to board and so on. Further, repairs are effected by card replacement. The function of the connector mechanisms to which the present invention relates is to inter-connect the conducting lines on any pair of abutting structures, whether these be cards, boards, cables or housings.

The prior art contains many proposed forms of such connectors and reference is made to but a selection of these, by way of example, the criterion for selecting being that all the prior art selections involve the use of a flexible conductive member, in some form or other, and one of the basic elements of the present invention is a flexible conductive film through the present invention uses its film in a way that is not to be found in the prior art. U.S. Pat. No. 3,149,896 to Hall J. R., relates to connecting a multiple conductor cable to a rigid circuit element by clamping the cable into a housing in such a way that its conductors are coupled to pins in the housing which extend into a slot into which the rigid circuit element is pushed, displacing the pins and establishing the required electrical connections. This is a typical example of the kind of connector which is virtually certain to damage the conducting lines of any rigid circuit element which is repeatedly pushed into the slot. U.S. Pat. Nos. 3,825,878 to Finger C., and 4,227,767 to Mouissie B., are essentially similar, as is, to some extent, the arrangement described in IBM Technical Disclosure Bulletin, vol. 25, No. 1, June 1982, pages 370 and 371, although it hints at a modification which might avoid insertion damage in that the housing may be arranged with extension to permit it to be used in the manner of a so-called "Bull" clip.

U.S. Pat. Nos. 3,573,704 to Tarver C. R., 3,629,787 to Wilson J., and 4,116,516 to Griffin W. L., all relate to connectors which may avoid the damage problem since they are dismantled and reassembled around the elements to be interconnected but cannot be thought of as being particularly convenient. The last of these three patents deals with the establishing of electrical connections to the various layers in a multi-layer cable.

U.S. pat. No. 3,977,756 to Rodondi A. F., relates to a connector in which a flexible printed circuit is wrapped around a rigid printed circuit and then is secured in its operative condition by a cap which is forced thereover. In this case, apart from being limited in the types of structure that it can interconnect, it may damage the flexible circuit board.

U.S. Pat. Nos. 4,252,389 to Olsson B. E., and 4,334,728 to Reynolds C. E. et al., however, both relate to zero insertion force connectors and are essentially non-damaging. In each case, a clamp carried by the rigid structure is used to exert wiping pressure on the idle side of a flexible conductive film placed between it and the rigid structure. These kinds of arrangement have several undesirable features including an unavoidable dependence on the accuracy of the user and the need for the clamp, in toto, to be carried by the rigid structure. In addition, the application of such an arrangement is essentially limited.

The present invention seeks to provide a connector mechanism that is non-damaging, of general application, is capable, at least in an extended form, of tolerating less than accurate handling by the user and will ensure positive electrical coupling of compatible structure and conducting line combinations.

According to one aspect of the present invention, there is provided a connector mechanism releasably electrically interconnecting two structures, each said structure carrying conducting lines, said connector mechanism comprising common actuator means; fixed contact means, said fixed contact means being mounted on one of said structures, electrically connected to said conducting lines on said one of said structures and fixed relative to said one of said structures; flexible conductive film, said flexible conductive film forming part of the other of said structures and accommodating at least one extension of said conducting lines thereof; floating contact means, said floating contact means being an electrically integral part of said flexible conductive film, carried by said common actuator means and free to move both toward and away from said fixed contact means as well as across said fixed contact means, as independent motions, under the control of said common actuator means, while said structures are maintained in an engaged juxtaposition.

According to another aspect of the present invention, there is provided a connector mechanism for electrically connecting a first and second structure, each of which carries conducting lines, comprising fixed contact means provided on said first structure and electrically connected to the conducting lines carried by said first structure, flexible film means provided with conducting lines, said conducting lines on said film being electrically connected at one end of said film means to the conducting lines carried by said second structure, floating contact means provided on said flexible film means, said conducting lines on said film means being electrically connected at the other end of said film means to said floating contact means, and actuator means associated with said film means for moving said floating contact means both toward and away from said fixed contact means and across the fixed contact means, as independent motions, while said structures are maintained in an engaged juxtaposition.

As described hereinafter, a connector mechanism according to the present invention, for electrically connecting two structures carrying conducting lines, comprises fixed contacts on one of the structures and floating contacts on the other of the structures, the floating contacts being free to move towards and away from the fixed contacts and across the fixed contacts as independent motions, under the control of a common actuator each floating contact being an electrically integral part, carried by the actuator, of a flexible conductive film.

The provision of a shroud on the fixed contact structure carrying markings registered with the fixed contacts and engaging the actuator provides coarse location, while the flexibility of the web and the mounting of the floating contacts on a resilient pad, on a carriage provided with cam followers riding on a multi-throw linear cam permits independent locating and wiping motions, independently of each other and at selected pressures, including, of course, zero pressure on insertion making the connector mechanism an effective ZIF connector.

The present invention will be described further, by way of example, with reference to embodiments thereof, as illustrated in the accompanying drawings.

IN THE DRAWINGS

Figure 1:
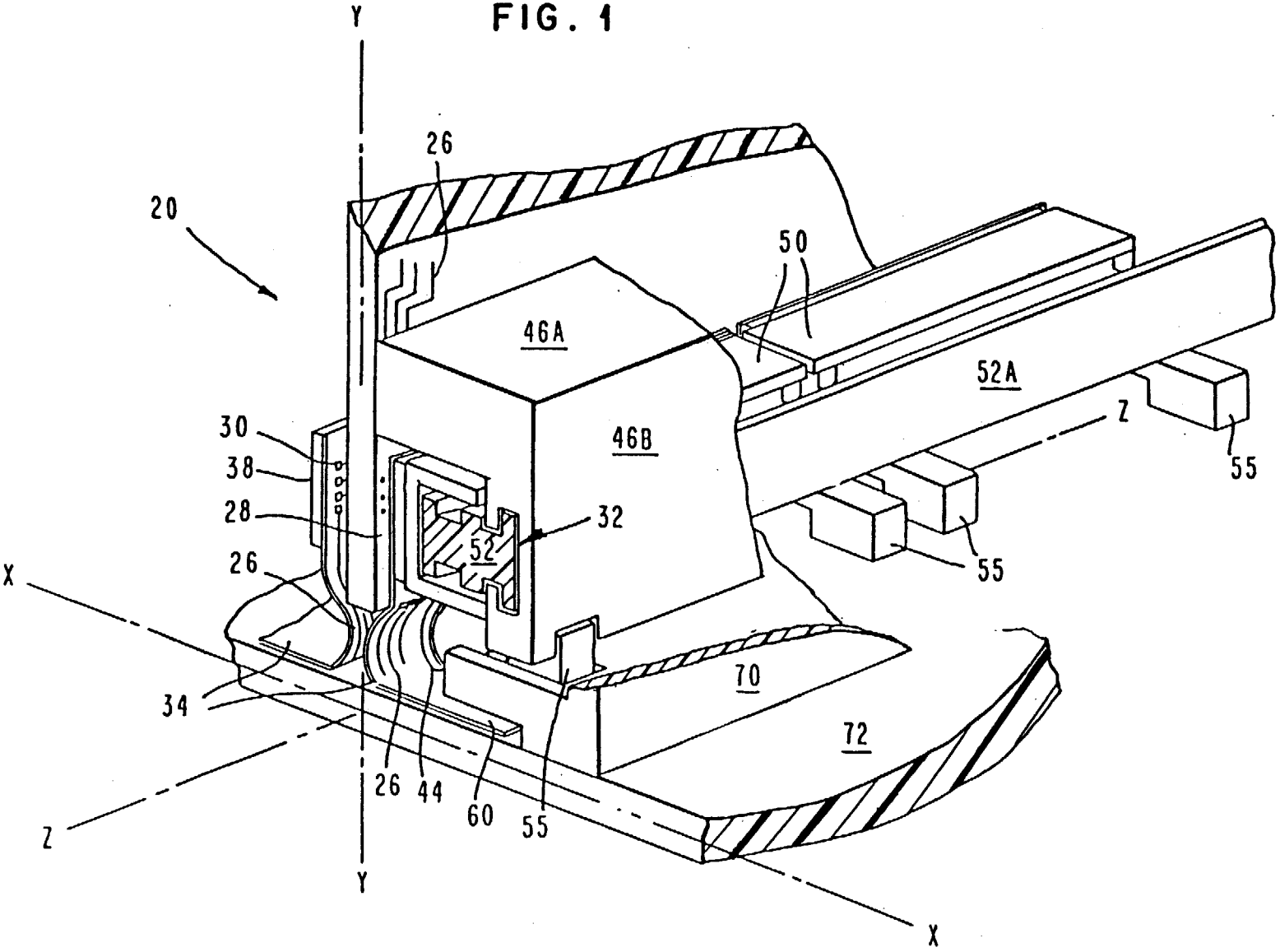
FIG. 1 is a partially cut-away, diagrammatic, perspective view of a mated edge connector circuit board and another board, interconnected by a plurality of connector mechanisms of one form according to the present invention.
Figure 2:
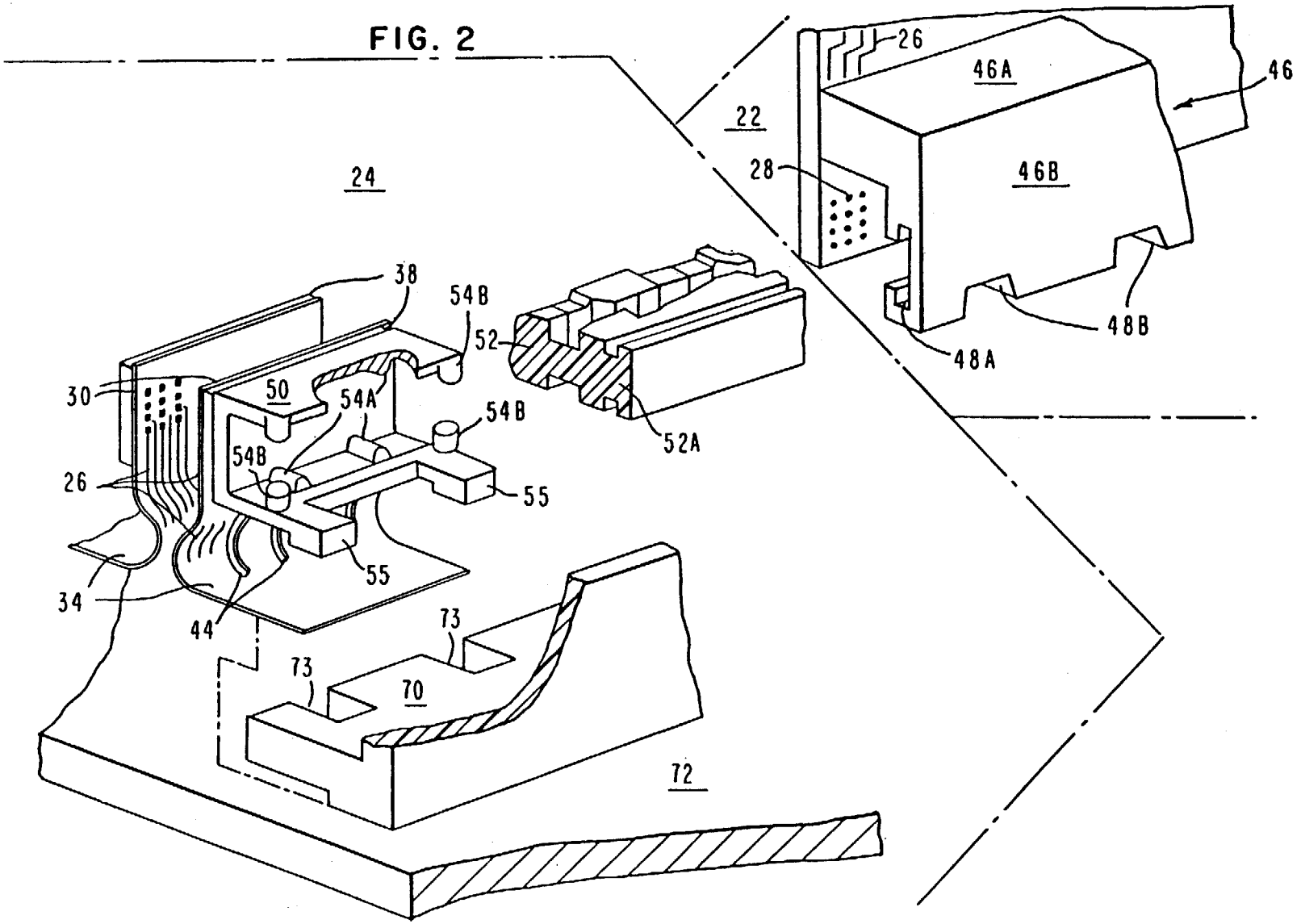
FIG. 2 is an exploded view of the arrangement of FIG. 1, further cut-away.

FIGS. 1 and 2 show one complete connector mechanism 20 and a plurality of partial connector mechanisms according to the present invention. Some component parts are detailed on the complete connector mechanism, which is located in the positive octant delineated by the co-ordinate axes shown in FIG. 1, and some on the partial mechanisms for clarity since they are located on surfaces of the complete mechanism that are obscured. The single connector mechanism electrically connects two structures 22, 24 carrying conducting lines 26, comprises fixed contacts 28 on structure 22, and floating contacts 30 on structure 24, the floating contacts being free to move towards and away from the fixed contacts and across the fixed contacts as independent motions, under the control of a common actuator 32, each floating contact being an electrically integral part carried by the actuator, of a flexible conductive film 34. The film (see FIG. 4) is formed of alternate layers of conductive and non-conductive material, so that at least some of the conductive material forms a transmission line structure, and the film is provided with apertures 44 to enhance its flexibility.

Figure 3:
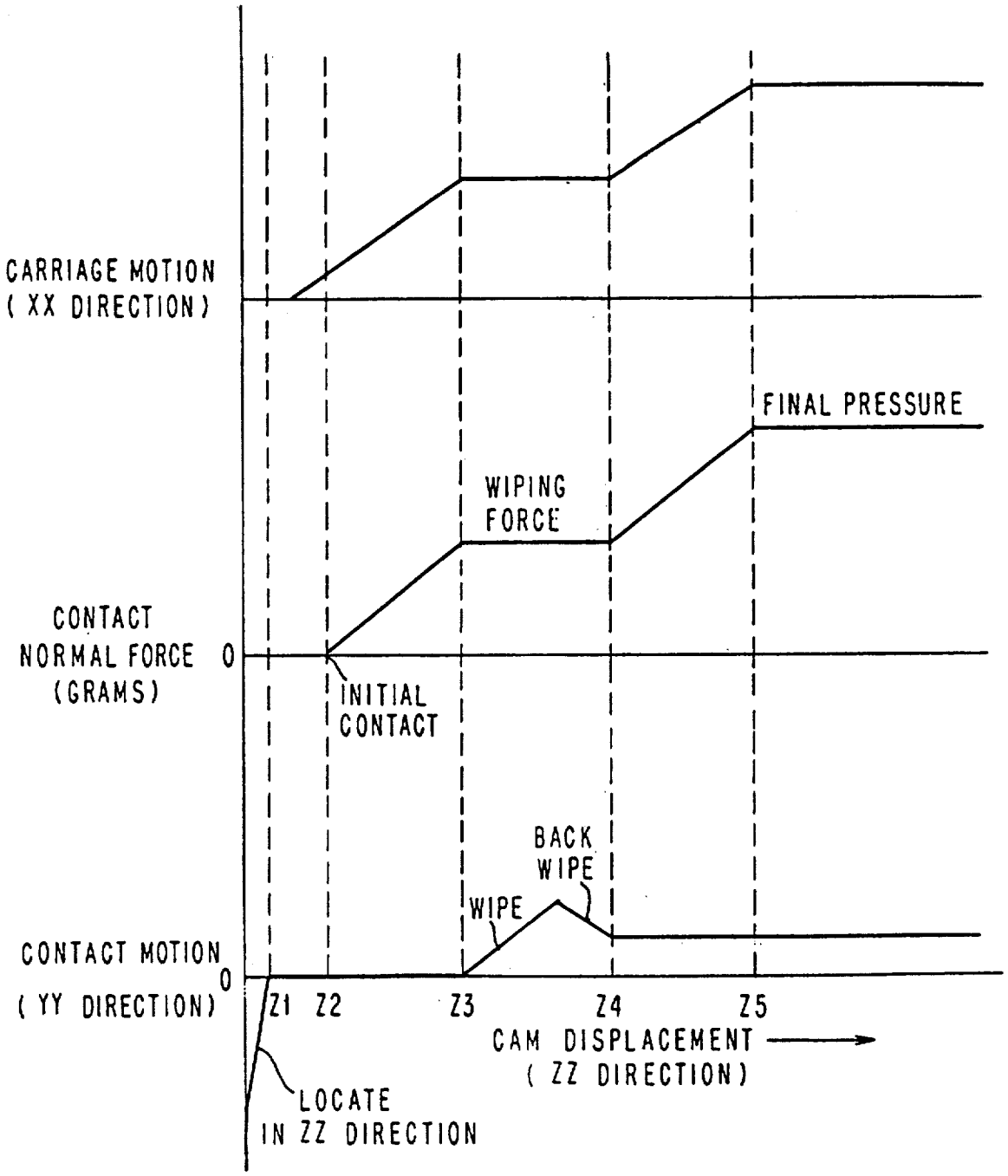
FIG. 3 is a diagrammatic graphical representation of the intercontact movements and pressures involved in the operation of the arrangement of FIGS. 1 and 2.

The common actuator is a compound camming mechanism, able to produce time separated motion in different directions (as illustrated in FIG. 3) in a single actuation, the floating contacts being carried by a resilient interposer 38, fixed to a carriage 50 which carries cam followers 54A and 54B engaging a linear cam 52.

When the connector mechanism 20 is assembled into the configuration shown in FIG. 1 by bringing together the two structures 22, 24, by relative motion in the ZZ direction, a single pass of the linear cam 52 produces the following main sequence of time separated relative movements:

motion of the floating contacts 30 toward the fixed contacts 28 in XX direction until the floating contacts 30 just touch the fixed contacts 28, followed by attempted motion of the floating contacts 30 toward the fixed contacts 28 such that distortion of the resilient interposer 38 applies a pressure between the fixed contacts 28 and floating contacts 30;

motion of the floating contacts 30 across the fixed contacts 28 in the YY direction;

motion of the floating contacts 30 substantially retracing at least part of the previous path across the fixed contacts in the YY direction; and attempted further motion of the floating contacts 30 towards the fixed contacts 28 further increasing the pressure between the fixed and floating contacts 28, 30.

The fixed contact structure 22 of the two structures shown in FIGS. 1 and 2 carries a rigidly attached shroud 46. The shroud 46 locates the cam in the XX and YY directions with respect to the fixed contacts on initial assembly of the connector mechanism and carries locating markings 48A, 48B which are registered with the fixed contacts. When the actuator 32 is initially actuated, by means of a handle (not shown), the carriage 50 is moved, in the YY direction, into engagement with the locating markings 48B of the shroud 46, locating the carriage in the ZZ direction.

The initial and terminal phases of the actuator 32 operation are relatively idle, and resetting of the actuator 32 returns the floating contacts 30 to their starting positions, retracing the listed motions in reverse order.

Figure 6:
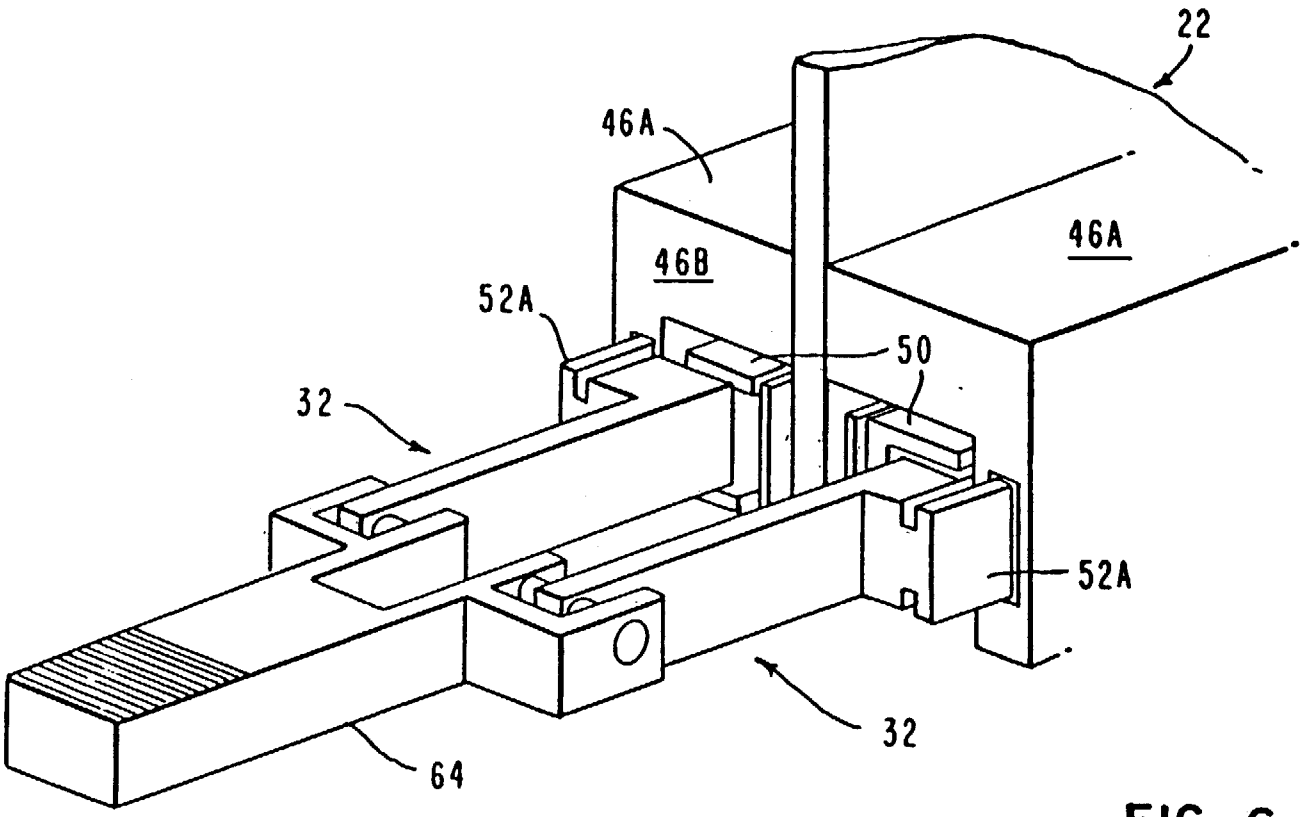
FIG. 6 is a diagrammatic perspective view of a detail of an alternative embodiment of the invention.

As already indicated, there is a connector mechanism 20 on each side of card 22, and the two connector mechanisms are loosely coupled, as by member 64 (see FIG. 6).

DETAILED DESCRIPTION OF THE EMBODIMENTS

Returning to the embodiments illustrated in FIGS. 1 to 5 of the drawings and considering them in greater detail, structure 22 is a printed circuit card, of which only a corner is shown, and has conducting lines 26 on both faces thereof, each set of conducting lines ending in a $4 \times N$ array of contact dimples 28, fixed relative to the card. The conducting lines 26 are only hinted at, rather than being shown accurately in FIGS. 1 and 2 and no attempt has been made to show their connection to the contact dimples 28. In any case, much of the conducting line configuration will be buried in most applications. Shroud 46 overhangs the contact dimple array and is formed of two substantially equal mutually perpendicular extents 46A and 46B. Extent 46A is perpendicular to the face of the card from which it extends and parallel to the card edge and the N-dimension of the contact array. Extent 46B extends parallel to the card face beyond the card edge and has a T-cross-section groove 48A let into its inner surface facing the contact array. Extent 46B has notches 46B let into its exposed edge. Selected surfaces of the groove and notches are accurately registered with the contact array and act as locating markings.

Linear cam 52 has an integral longitudinal rail 52A which fits into the groove 48A in the shroud and aligns the pass direction of the linear cam relative to the fixed contact array in the ZZ direction. The cam 52 has multiple pairs of camming surfaces providing throws in both the XX and the YY directions but these are arranged, relative to the cam followers 54A and 54B, so that the currently effective throw is either entirely in the XX direction or entirely in the YY direction. The effect of these throws for a single pass of the linear cam is illustrated in FIG. 3.

In addition to fitting in the groove 48A in the shroud, the linear cam 52 also fits into the carriage 50 which is a generally rectangular channel, open at the ends for access in the ZZ direction and having walls extending in the XX direction. Eight cam followers are located in the inner surfaces of the carriage channel. The four followers 54A cooperate with the cam to move the carriage in the YY direction, while the four followers 54B cooperate with the cam to move the carriage in the XX direction. It is pointed out that the recited relative orientation of the component parts holds for the connector mechanisms when assembled. Clearly, since each mechanism can be dis-assembled and handled in isolation there is no absolute significance in the recited orientations. The object of the exercise is to locate the cam in the shroud and, by moving the cam in the carriage in the ZZ direction, move the carriage in both the XX direction and the YY direction while keeping these motions quite separate.

The base of the carriage channel thus aligns with extent 46B of the shroud and resilient interposer 38 is fixed to the exposed surface of the base. The end of flexible film 34 that carries the floating contacts 30, hidden for the full mechanism in the positive octant but shown for the opposed partially illustrated mechanism, is fixed to the exposed surface of the interposer with the floating contacts, in a $4 \times N$ array conforming to the fixed contact array, exposed and aligned with the carriage as the fixed contact array is aligned with the shroud. The floating contacts 30 are flat and square and the intention is to center one fixed contact dimple 28 on each floating contact flat 30, assuming a fully active array. The film 34 passes under the carriage and is locked under a guide rail 70 fixed to a mother board 72, the conducting lines 26 in the film being electrically coupled to the mother board conducting lines (not shown). Thus, a single basic floating contact structure in this arrangement comprises the cam 52, the carriage 50, the interposer 38, the film 34, the guide rail 70 and the mother board 72 (although a plurality of connector mechanisms are indicated in FIGS. 1 and 2 and certain component elements are shared).

The cam and carriage combination is connected to the mother board by the film 34, the inherent flexibility of which is enhanced by the longitudinal apertures 44 therein, but the combination can move relatively freely away from and across the mother board due to the film's flexibility and also due to a certain amount of film length which is surplus to minimal requirements. This freedom of movement of the combination is necessary to permit interlocking of the actuator, shroud and guide rail to establish registration in a manner to be described and to permit the cam driven motion sequence of the floating contacts. The connector mechanisms of this invention are designed to be electrical connectors not physical locking mechanisms. They permit the card structures to be assembled and held mechanically together, without the need for registration to a degree of precision equivalent to the contact pitch, since the the fine adjustment is internal, using the slack in the film.

Interlocking of the component elements is partly a function of the engagement of the cam rail 52A in the groove 48A and partly a function of the engagement of a pair of lugs 55 extending outwardly and downwardly from the lower wall of the carriage, in the notches 48B in the shroud, as well as in a corresponding pair of cut-aways 73 in the guide rail.

The lugs essentially remain engaged in the cut-aways but, being of smaller dimensions, can move within the cut-aways in all three indicated directions, and, in particular, can move downwardly in the YY direction by at least the depth of the notches 48B without impacting the film 34. If one considers the rail of the cam to be fixed in the YY direction relative to the mother board, which is effectively correct in all operative conditions, and the cam to be fully retracted, the cam maintains the carriage depressed sufficiently in the YY direction for the bottom of the shroud, when sliding forwardly in the ZZ direction with the cam rail engaged in the shroud groove, to clear the tops of the lugs. In this way, the notches 48B can be brought into position over the lugs. Also, during such initial engagement, other surfaces of the cam maintain the carriage, and hence the floating contacts, clear of the fixed contacts on the card. From the point of view of establishing electrical contact connection, the camming mechanism is idle and the conceptual conditions indicated at the origins in the graphs of FIG. 3 obtain. During initial engagement, there is no relative movement of the cam with respect to the carriage.

To establish electrical contact connection, the cam is pulled steadily in the ZZ direction for a fixed distance, moving the carriage alternately in the YY direction and in the XX direction relative to the shroud and hence correspondingly moving or attempting to move the floating contacts relative to the fixed contacts. This activity is illustrated to the right of the origins in FIG. 3. As the cam moves in the $Z_2$ direction from its retracted position corresponding to the origin in FIG. 3 to a position indicated by $Z_1$, the carriage is raised in the YY direction relative to the shroud, moving the lugs upwardly in the YY direction into the notches 48B. The notches have tapered sides and serve to register the carriage with the shroud in the ZZ direction, consequently, simplarly registering the contacts in the ZZ direction.

The next part of the action of the cam as it moves from $Z_1$ to $Z_3$ is to move the carriage away from the shroud toward the card in the XX direction and, at some point of the cam movement indicated as $Z_2$, the contacts will touch and the resilient interposer 38 will begin to compress. At this point, actual pressure between the contacts begins to build, as indicated in the middle graph in FIG. 3. Inter-contact pressure builds due to compression of the interposer until, at $Z_3$, the cam ceases to drive the carriage in the XX direction and starts to drive the carriage first upwardly and then partially back again in the YY direction. This action, corresponding to travel of the cam from $Z_3$ to $Z_4$, produces wiping and backwiping of the floating contacts over the fixed contacts at constant inter-contact pressure. Thereafter, the cam, traveling from $Z_4$ to $Z_5$, ceases to drive the carriage in the YY direction and continues driving the carriage away from the shroud in the XX direction, increasing the compression of the interposer and the inter-contact pressure. Thereafter, the cam becomes idle, maintaining the status quo until movement of the cam ceases, electrical contact having been finally established at $Z_5$.

It is pointed out that, with the described arrangement, the card contacts are well protected. During engagement, with the cam "retracted", it is not possible to both engage the cam rail with the shroud groove and have even accidental contact collision. During wipe, the inter-contact pressure is controlled and constant, to produce adequate wiping action with minimum wear.

Figure 4:
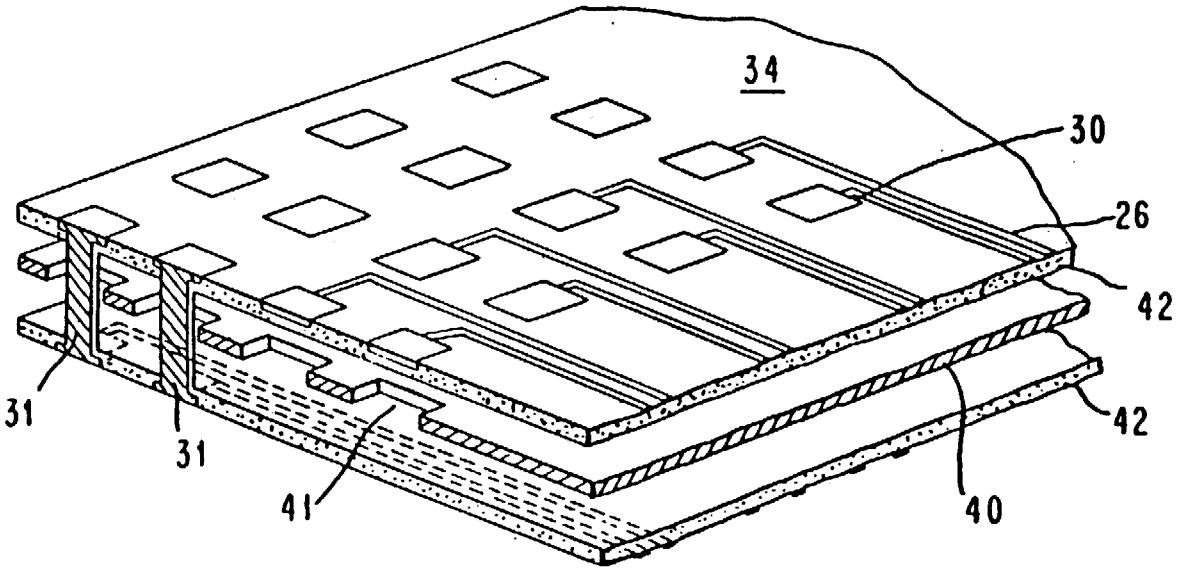
FIG. 4 is a diagrammatic partially exploded perspective view of one end of one of the flexible webs of the arrangement of FIGS. 1 and 2.
Figure 5:
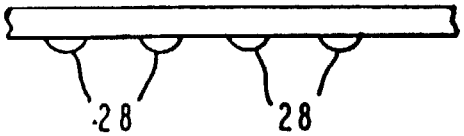
FIG. 5 is a side view of the fixed contact region of the connector mechanism of FIGS. 1 and 2.

The film structure is illustrated in FIG. 4 which concentrates on the end of the film 34 which incorporates the floating contacts 30. The film comprises a sandwich of five layers 30 and 26, 42, 40, 42, 26 which are shown partially separated but which are, in fact, bonded together. Layers 42 are nonconductive polymer and enclose conductive layer 40 which, apart from an array of apertures 41 corresponding to the contact array and the slots 44, is a continuous layer comprising a ground plane. The two outer layers are conductive and define the floating contacts 30 and the individual conductive paths thereto. Because a dense contact array is desired, only two rows of contacts 30 connect directly to conductive paths 26 provided on the same (upper) exposed surface as is occupied by the contacts. The other two rows of contacts 30 connect, through conductive vias 31 in the film, to respective conductive paths provided on the other (lower) exposed surface.

As already indicated, the basic connector mechanism connects to one area of one side of the card. As hinted at in FIGS. 1 and 2, one would reasonably expect to require connector mechanisms on both sides of a card and, for a card of significant edge length, plural films, interposers (which may be springs) and carriages, per side. In this latter case, the cam and shroud, on each side of the card, can be common to all the connector mechanisms of the respective side and it is recommended that, with connector mechanisms on both sides of the card, the cams are loosely inter-connected as illustrated in FIG. 6 by a coupling yoke 64.

As the cam is pushed toward its retracted position, the illustrated connector mechanism will repeat the described sequence of operations, but in the reverse order, leaving the card and shroud free to be disengaged by being slid backwardly in the ZZ direction. It is possible, however, by use of a differently constructed cam to alter the sequence of relative motions on retraction the cam so that the first action is complete separation of the contacts in the XX direction, followed by direct passage of the carriage to the point at which the carriage is depressed sufficiently to disengage the lugs from the notches 48B.

As opposed to the specific arrangement shown in the drawings, the part 60 of the film 34 remote from the floating contacts 30 may be connected to:

(a) the floating contacts 30 of a similar connector mechanism 20, so that the conducting lines of the floating contact structure, in each case, are merely those of the flexible web; or (b) a fixed structure, such as a housing, or to a movable structure which need be neither accurately registered with respect to the fixed contacts 28, nor even close thereto.

We claim:

1. A zero insertion force connector mechanism releasably electrically interconnecting two structures, each said structures carrying conducting lines, said connector mechanism comprising:

a common actuator means mounted on a second of said two structures so as to have one degree of freedom of movement only relative thereto between a first position and a second position, said common actuator locking said two structures in fixed relationship to each other, when in an engaged juxtaposition;

first contact means electrically connected to said conducting lines on a first of said two structures and fixed relative to said first structure;

a flexible conductive film forming part of said second structure and incorporating at least extensions of said conducting lines thereon;

second contact means electrically connected to said conducting line extensions in said flexible conductive film and being carried by said common actuator means and being capable of independent orthogonal motion with two degrees of freedom relative to said first contact means by movement of said common actuator means, from its first to its second position while said first and second structures are maintained in an engaged juxtaposition.

2. The connector mechanism of claim 1, wherein said common actuator means comprises a compound camming mechanism able to produce time separated motion in different directions in a single actuation.

3. The connector mechanism of claim 2, wherein said common actuator means comprises a carriage;

at least one cam follower mounted on said carriage;

a linear cam movable from said first position to said second position and arranged when away from said first position to engage said at least one cam follower; and a resilient interposer, said resilient interposer being fixed to said carriage and supporting said second contact means array, said carriage engaging said second structure so as to be fixed in the direction of movement of the linear cam and free to move in directions perpendicular thereto.

4. The connector mechanism of claim 2, wherein, with the connector mechanism assembly by the prior bringing together of said two structures, a single pass of said common actuator means produces the following time separated sequence of relative movements:

motion of said second contact means array toward said first contact means array until said second contact means touch said first contact means; followed by motion of said second contact means array across said fixed contact means array.

5. The connector mechanism of claim 3, wherein, with the connector mechanism assembled by the prior bringing together of said two structures, a single pass of said common actuator means produces the following time separated sequence of relative movements:

motion of said second contact means array toward said first contact means array until said second contact means just touch said fixed contact means; followed by attempted motion of said second contact means array toward said first contact means array such that distortion of said resilient interposer applies a pressure between said first and second contact means; followed by motion of said second contact means array across said first contact means array; followed by further attempted motion of said second contact means array towards said first contact means array further increasing the pressure between said first and second contact means.

6. The connector mechanism of claim 3, wherein, with the connector mechanism assembled by the prior bringing together of said two structures, a single pass of said linear cam produces the following time separated sequence of relative movements:

motion of said second contact means array toward said first contact means array until said second contact means just touch said first contact means; followed by attempted motion of said second contact means array toward the first contact means array such that distortion of said resilient interposer applies a pressure between said first and second contact means; followed by motion of said second contact means array across said first contact means array; followed by motion of said second contact means array substantially retracing part of its previous path across said first contact means arrays; followed by further attempted motion of said second contact means array towards said first contact means array further increasing the pressure between said first and second contact means.

7. The connector mechanism of claim 1, further including a rigid shroud, mounted on said first structure and engaging said common actuator means when said structures are in an engaged juxtaposition to act as a coarse locator for said structures when said common actuator means is in its first position.

8. The connector mechanism of claim 3, further including a rigid shroud, mounted on said first structure and engaging said common actuator means when said structures are in an engaged juxtaposition to act as an accurate locator for said linear cam in directions perpendicular thereto, and for said carriage in the direction of bringing together of said two structures when said linear cam is away from its first position, relative to said first contact means array.

9. The connector mechanism of claim 7, wherein the shroud embodies positioning elements registered with said first contact means, and engageable with said actuator means on movement thereof away from its said first position to accurately relatively locate said two structures.

10. The connector mechanism of claim 8, wherein the shroud embodies positioning elements registered with said first contact means, and engageable by said linear cam and said carriage.

11. The connector mechanism of claim 6, further including a rigid shroud, said shroud being mounted on said first structure; and positioning elements, said positioning elements being incorporated in said shroud, in registration with said first contact means and engageable by said linear cam and said carriage when said structures are in an engaged juxtaposition, to act as an accurate locator for said linear cam in directions perpendicular thereto, and for said carriage in the direction of bringing together of said two structures when said linear cam is away from its first position, relative to said first contact means.

12. The connector mechanism of claim 9, wherein, with the connector mechanism assembled by the prior bringing together of said two structures, a single pass of said common actuator means produces the following time separated sequence of relative movements:

motion of said second contact means array toward said first contact means array until said second contact means just touch said first contact means; followed by attempted motion of said second contact means array toward the first contact means array such that distortion of said resilient interposer applies a pressure between said first and second contact means; followed by motion of said second contact means array across said first contact means array; followed by motion of said second contact means array substantially retracing part of its previous path across said first contact means array; followed by further attempted motion of said second contact means array towards said first contact means array further increasing the pressure between said first and second contact means.

13. The connector mechanism of claim 12, as one of a pair of such connector mechanisms connecting said two structures.

14. The connector mechanism of claim 12, as one of a plurality of such connector mechanisms connecting said two structures, wherein said connector mechanism incorporates plural flexible films and an equal plurality of carriages.

15. The connector mechanism of claim 14, further including a coupling yoke coupling said linear cam means of said connector mechanism to the linear cam means of the other said mechanism.

16. A zero insertion force connector mechanism, for electrically connecting a first and a second structure each carrying conducting lines, comprising:

a first contact means fixedly mounted as an array on said first structure and electrically connected to said conducting lines carried by said first structure;

flexible film means provided with conducting lines, said conducting lines on said film being electrically connected at one end of said film means to the conducting lines carried by said second structure;

second contact means provided on said flexible film means as an array of a same spacing and configuration as said first contact means array;

said conducting lines on said flexible film means being electrically connected at another end of said flexible film means to said second contact means; and actuator means associated with said film means for moving said second contact means with independent orthogonal motion with two degrees of freedom relative to said first contact means array while said structures are maintained positionally locked relative to one another in accurate registration in an engaged juxtaposition by said connector mechanism.

17. The connector mechanism of claim 16, wherein said actuator means comprises a carriage;

a resilient interposer, said resilient interposer being fixed to said carriage and mounting said second contact means array; and a compound camming mechanism able to produce time separated motion in different directions in a single actuation, and incorporating plural cam followers mounted on said carriage; and linear cam means engaging said cam followers, and arranged to produce, with the connector mechanism assembled by the prior bringing together of said two structures, by a single pass of said actuator means, the following time separated sequence of relative movements:

motion of said second contact means array toward said first contact means array until said second contact means just touch said fixed contact means; followed by attempted motion of said second contact means array toward said first contact means array such that distortion of said resilient interposer applies a pressure between said first and second contact means; followed by motion of said second contact means array across said first contact means array; followed by further attempted motion of said second contact means array towards said first contact means array further increasing the pressure between said first and second contact means.

18. The connector mechanism of claim 17, further including a rigid shroud, mounted on said first structure and engaging said common actuator means when said structures are in an engaged juxtaposition to act as an accurate locator for said linear cam in directions perpendicular thereto, and for said carriage in the direction of bringing together of said two structures when said linear cam is away from its first position, relative to said first contact means array, said shroud incorporating locating elements registered with said first contact means, and engageable by said linear cam and said carriage.

19. A zero insertion force connector mechanism for electrically connecting a first and a second structure, each carrying conducting lines, comprising:

first contact means fixedly mounted on said first structure and electrically connected to said conducting lines carried by said first structure;

flexible film means provided with conducting lines, said conducting lines on said film being electrically connected at a first end thereof to conducting lines carried by said second structure;

second contact means provided on said flexible film means, said conducting lines on said film means being electrically connected at a second end thereof to said second contact means; and actuator means associated with said film means for moving said second contact means with independent orthogonal motion with two degrees of freedom relative to said first contact means when said structures are locked relative to each other in accurate registration in an engaged juxtaposition by said connector mechanism.

*20. A connector for electrically connecting the circuits on one side of a circuit card to circuits on a circuit board through circuits on a flexible film having some circuits thereon terminated to circuits on the board and further having at least one free side extending away from the board, comprising:*

*a. an elongated base member for mounting on a circuit board with a circuit card receiving space there alongside;*

*b. support means on the base member for supporting actuator means;*

*c. actuator means having a cam thereon slidably mounted on the support means on the base member for longitudinal travel; and*

*d. a module having one surface for receiving a free side of a flexible film and one or more cam followers, the module being movably mounted so that the one surface faces the card receiving space and the one or more cam followers cooperate with the cams such that by moving the actuator means longitudinally, the module moves laterally towards the card receiving space.*

*21. A connector for electrically connecting the circuits on one side of a circuit card to circuits on a circuit board through circuits on a flexible film having some circuits thereon terminated to circuits on the board and further having at least one free side extending away from the board, comprising:*

*a. an elongated base member for mounting on a circuit board with a circuit card receiving space there alongside;*

*b. support means on the base member for supporting actuator means;*

*c. actuator means having cams thereon slidably mounted on the support means on the base member for longitudinal travel; and*

*d. a module having one surface for receiving a free side of a flexible film and one or more cam followers, the module being movably mounted so that the one surface faces the card receiving space and the one or more cam followers cooperate with the cams such that by moving the actuator means longitudinally, the module moves laterally towards and away from the card receiving space.*

*22. The connector of claim 21 wherein the module includes cam followers which cooperate with cams on the actuator means to move the module perpendicular relative to the base member during longitudinal travel of the actuating means.*

*23. The connector of claim 22 wherein the lateral and perpendicular movements of the module are time separated.*

*24. The connector of claim 22 further including cooperating locating means for positioning the base member, support means and module in a predetermined registration, one with the other.*

*25. The connector of claim 24 wherein said locking means further provide means for removably locking the module against longitudinal travel.*

*26. The connector of claim 22 wherein the support means include card support means for supporting a card extending into the card receiving space alongside the base member.*

*27. The connector of claim 26 wherein the support means includes a skirt having a slot extending along the length thereof and opening out towards the card receiving space and further the actuator means includes a guide bar slidingly received in and supported by the slot.*

*28. The connector of claim 27 wherein the cams on the actuator means are carried on a cam bar which is joined to the guide bar by connecting means such that the cam bar is positioned between the skirt and the card receiving space.*

*29. The connector of claim 28 wherein the cams are positioned on the sides and edges of the cam bar.*

*30. The connector of claim 29 wherein the module is positioned on the cam bar.*

*31. The connector of claim 21 wherein the base member includes a pair of support means, each being adjacent a*

*card receiving space to provide a basis for two, side-by-side connectors, with each connector adapted to connect a card surface to the circuit board.*

*32. A connector for electrically connecting a circuit card to a circuit board through circuits on flexible film strips with some circuits on the strips being terminated to the board and with at least one free side of each strip extending away from the board, comprising:*

*a. a pair of elongated base members adapted for mounting on a circuit board in spaced apart, parallel fashion to define a card slot therebetween into which a circuit card may be placed;*

*b. actuator guide means located on each base member and adapted to slidingly receive actuator means;*

*c. actuator means having cams thereon and slidably located in the actuator guide means for longitudinal travel;*

*d. at least two modules having cam followers and a receiving surface for receiving a free side of a flexible film strip, said modules being positioned on each side of the card slot with the receiving surface facing thereinto and with the cam followers cooperating with the cams on the actuator means so that by moving the actuator means longitudinally, the modules move laterally towards and away from the card slot.*

*33. The connector of claim 32 wherein said modules include cam followers which cooperate with cams on the actuator means to move the modules perpendicular relative to the card slot.*

*34. The connector of claim 32 further including cooperating locating means on and for positioning the base members, actuator guide means and modules in a predetermined registration, one with the other.*

*35. The connector of claim 34 wherein said locating means further provide means for removably locking the modules against longitudinal travel.*

*36. The connector of claim 34 wherein the actuator guide means may be fastened together with a circuit card therebetween so that upon locating the actuator guide means on the base members, the card extends into the card slot.*

*37. The connector of claim 36 wherein the actuator guide means include skirts having guide bar support means extending along the lengths thereof and wherein the actuator means includes a guide bar which is slidingly received in and supported by the guide bar support means.*

*38. The connector of claim 37 wherein the cams on the actuator means are carried on a cam bar which is joined to the guide bar by connecting means such that the cam bar is positioned between the skirt and the card slot.*

*39. The connector of claim 38 wherein the cams are positioned on the sides and edges of the cam bar.*

*40. The connector of claim 39 wherein the modules are adapted to be positioned on the cam bars and with the cam followers cooperating with the cams.*

*41. The connector of claim 32 wherein at least one base member includes two actuator guide means facing in diametric directions and thereby provide the basis for two connectors, side-by-side, with each connector connecting a circuit card surface to the circuit board.*

* * * * *